United States Patent [19]
Smith et al.

[11] 3,757,469
[45] Sept. 11, 1973

[54] PLANT WATERING AND FERTILIZING DEVICE

[76] Inventors: Charles T. Smith, 401 Alleghaney Ave., Towson, Md. 21204; Irvin B. Ady, Sharon Acres Rd., Forest Hill, Md. 21050

[22] Filed: Mar. 1, 1972

[21] Appl. No.: 230,859

Related U.S. Application Data

[63] Continuation of Ser. No. 14,258, Feb. 24, 1970.

[52] U.S. Cl.......................... 47/48.5, 61/13, 111/7.1
[51] Int. Cl............................................ A01g 29/00
[58] Field of Search.......................... 47/48.5; 61/13; 111/7.1

[56] References Cited
UNITED STATES PATENTS

| | | | |
|---|---|---|---|
| 2,052,020 | 8/1936 | Black | 61/03 |
| 2,798,768 | 7/1957 | Babin | 61/13 |
| 547,123 | 10/1895 | Lee | 47/48.5 X |
| 953,080 | 3/1910 | Wiggins | 47/48.5 |
| 563,921 | 7/1896 | Gridley | 47/48.5 X |
| 968,226 | 8/1910 | Ziller | 47/48.5 X |
| 3,109,258 | 11/1963 | Jensen | 47/48.5 |
| 584,886 | 6/1897 | Mead | 47/48.5 X |
| 496,187 | 4/1893 | Clark | 47/48.5 X |
| 3,151,415 | 10/1964 | James | 47/48.5 |
| 2,885,977 | 5/1959 | Fabus | 47/48.5 X |

FOREIGN PATENTS OR APPLICATIONS

| | | | |
|---|---|---|---|
| 703,595 | 2/1954 | Great Britain | 47/48.5 |
| 384,156 | 10/1923 | Germany | 47/48.5 |
| 1,217,816 | 5/1960 | France | 47/48.5 |

*Primary Examiner*—Robert E. Pulfrey
*Assistant Examiner*—Eugene H. Eickholt
*Attorney*—J. Wesley Everett et al.

[57] ABSTRACT

An irrigating and feeding device for plants having a reservoir member for holding a supply of water, a controlled flow seepage device for location adjacent the root system of the plant or plants to be treated and a conduit or fluid conductor connected between the reservoir and seepage device for conducting the fluid in the reservoir to the seepage device. The seepage device may contain material of high moisture retention qualities and a soluble fertilizing agent for feeding the plants.

1 Claim, 15 Drawing Figures

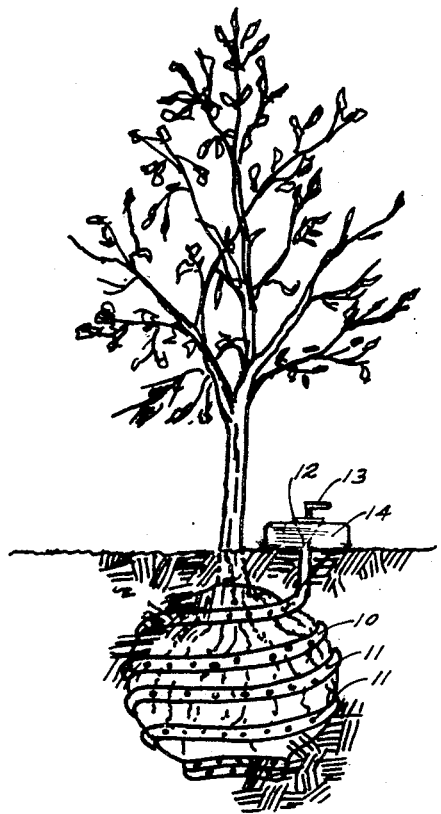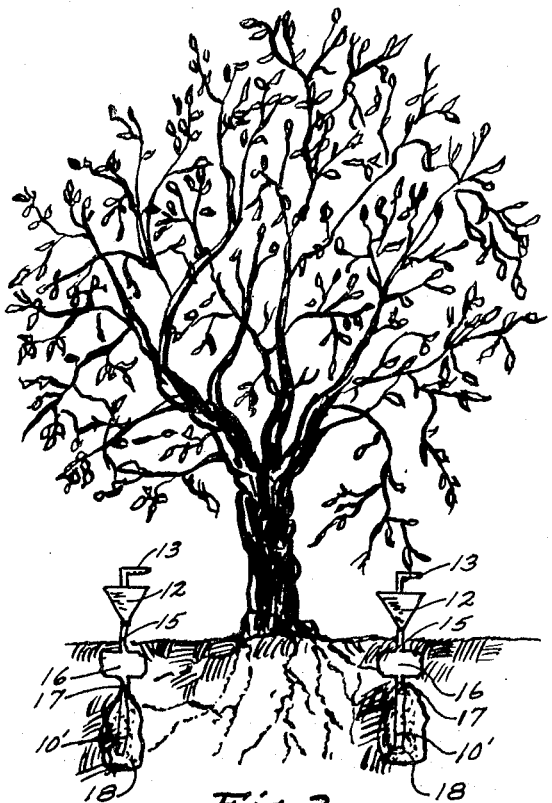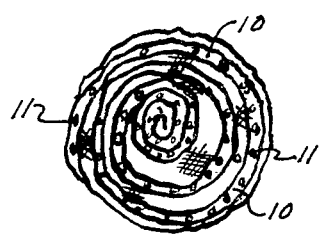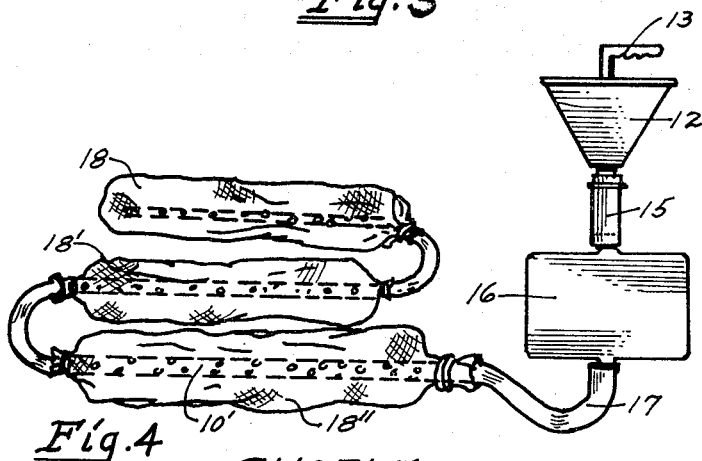

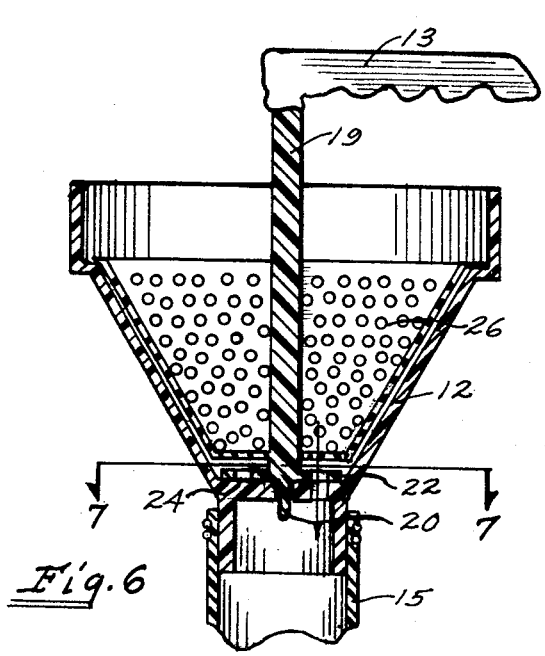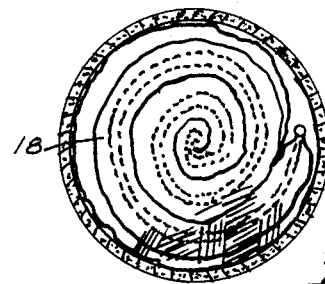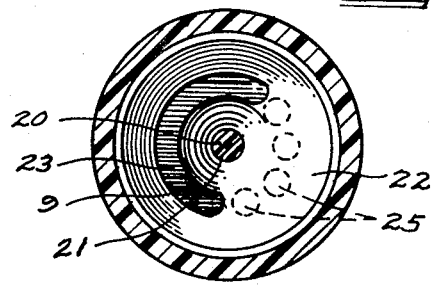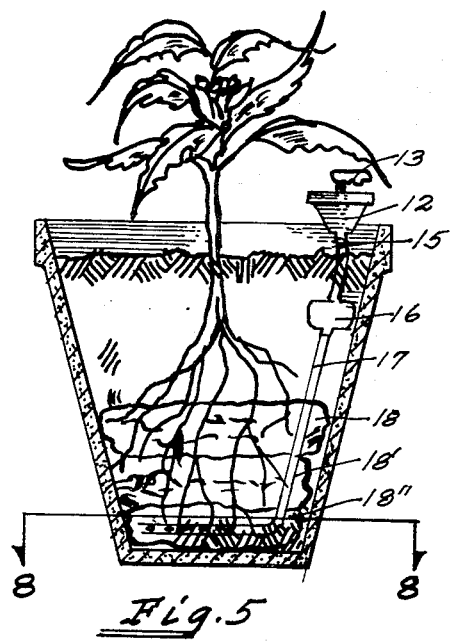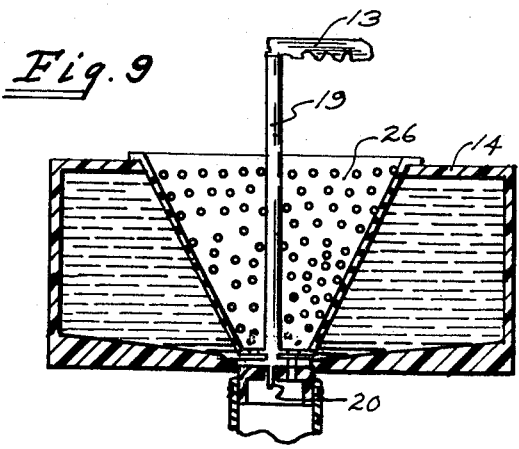

PATENTED SEP 11 1973 3,757,469
SHEET 3 OF 3
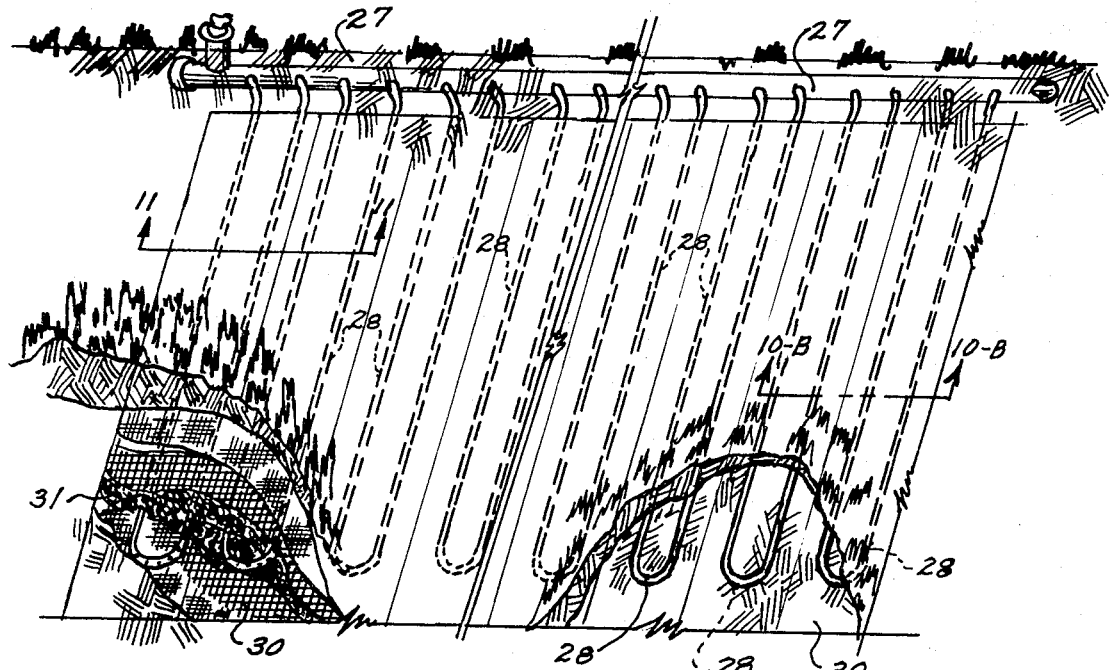
FIG.10  FIG.10-A
FIG.10-B
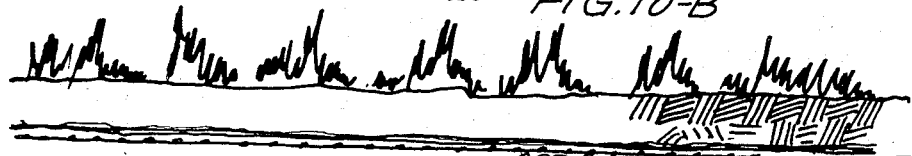
FIG.11
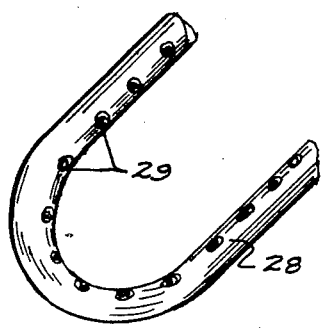
FIG. 12
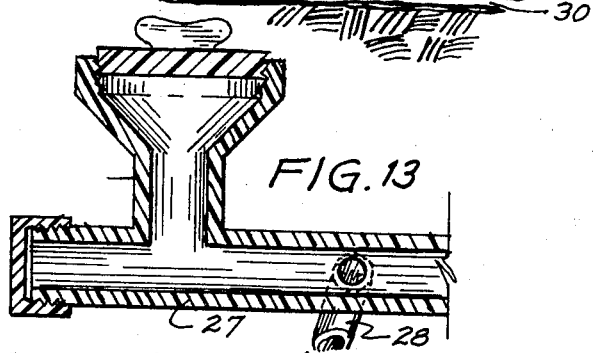
FIG.13
CHARLES T. SMITH & IRVIN B. ADY
INVENTORS
BY: *[signature]*
ATTORNEY
*George L. Brehm*
AGENT

PLANT WATERING AND FERTILIZING DEVICE

This application for patent is a continuation of applicants' patent application, Ser. No. 14,258, filed on Feb. 24, 1970, and now abandoned.

The instant invention relates to irrigating and feeding or fertilizing devices for plants and is of such versatile nature as to be applicable to small potted house plants or to large outside plants such as trees.

It is one object of this invention to provide an irrigating and fertilizing device for plants which is simple in construction and foolproof in operation.

It is another object to provide such a device which may be applied to a plant or plants with a minimum of work.

It is still another object to provide a device of this character which will have a long life.

These and other objects and advantages will become more apparent as this description proceeds and reference is had to the accompanying drawings which form a part of this specification and in which like reference characters refer to like parts.

In said drawings:

FIG. 1 is a view in side elevation and partly in section of my invention applied to a tree;

FIG. 2 is a bottom plan view of the device shown in FIG. 1;

FIG. 3 is a side view of a device similar to FIG. 1 but of slightly modified form;

FIG. 4 is a side view of another modification;

FIG. 5 is a view of still another modification as applied to a potted plant;

FIG. 6 is an enlarged sectional view of the water reservoir and control valve used on several of the devices shown;

FIG. 7 is a sectional view on line 7—7 of FIG. 6;

FIG. 8 is a sectional view on line 8—8 of FIG. 5;

FIG. 9 is a sectional view of a slightly modified form of reservoir and control valve;

FIG. 10 is a perspective view, partly in section, of a modified form of the device particularly adapted for use with lawns or ground cover plants;

FIG. 10-A shows still another modification of the device similar to that shown in FIG. 10;

FIG. 10-B is a sectional view taken on line 10-B of FIG. 10-A;

FIG. 11 is a sectional view on line 11—11 of FIG. 10;

FIG. 12 is a fragmentary perspective view of one of the perforated U tubes used in the device of FIGS. 10 and 11; and FIG. 13 is a sectional view of the water inlet opening and cap of the device of FIG. 10.

Referring now more in detail to the drawings with particular reference, for the present, to FIGS. 1 and 2, 10 represents a flexible tube or pipe which is made pervious to the passage of fluid therethrough either by being made of fluid permeable material such as canvas, burlap or the like or by being provided with numerous perforations as shown at 11.

The tube 10 is connected, at its one end, to a water inlet container 12 with control valve actuator 13 into which water may be fed and its flow to the tube 10 properly controlled. An enlarged reservoir 14 as shown in FIG. 1 for holding a greater quantity of water than the container 12 normally affords may be provided if found desirable. Details of the water inlet container 12 and control valve 13 will be discussed in more detail hereinafter in connection with FIGS. 6 and 7.

In FIGS. 1 and 2 the tube 10 is shown as applied to the "balled and burlapped" roots of a shrub or tree, such as may be purchased at a nursery for home planting. The tube 10 is wrapped around the balled roots as shown and the whole then planted. The water inlet container and reservoir may be conveniently placed on the surface of the ground adjacent the plant or tree. The water inlet may also be connected with an ordinary garden hose and the pressure is regulated to supply the desired amount of water to the area of the plant or plants as the case may be.

The modification shown in FIG. 3 comprises the inlet container 12 and control valve 13 identically the same as that shown in FIG. 1 connected through a tube 15 to a reservoir 16 which may be located below ground as shown. An outlet tube 17 from the reservoir connects to the pervious tube 10' from which the water may seep to moisten the plant roots. Tube 10' may be surrounded with a pervious container 18 and the space between the tube 10' and the container 18 filled with a moisture retentive material such as peat moss or the like. Soluble fertilizer also may be mixed with the water retentive material so that the device may not only serve as a watering device but also as a feeding device for plants.

The device shown in FIG. 3 is well adapted for application to large trees or other well established plants as it required a minimum of digging to place the device for proper functioning adjacent a tree or plant.

The device shown in FIG. 4 is substantially the same as that of FIG. 3 except that instead of a single pervious container 18 a number of such containers 18, 18' and 18'' are connected in series to the reservoir 16, to proportionately increase the watering and feeding capacity of the device.

In FIGS. 5 and 8 there is shown a potted plant and the modification of the device shown in FIG. 4 used therewith. As seen in FIG. 8 especially, the containers 18, 18', 18'' may be spirally wrapped around within the pot and covered with the earth of the plant.

FIGS. 6 and 7 illustrate the details of the water inlet container 12 and valve means 13, as used in the devices shown in FIGS. 3, 4 and 5. The valve actuator 13 has a vertical valve stem 19 rotatably mounted at its lower end in the container 12 through the medium of the reduced diameter stud 20 extending through an opening 21 in the lower end of the container 12. A valve disc 22 provided with an arcuate opening 23 is located at the lower end of the stem 19, and rotates with the latter. This disc cooperates with and rotates directly above the bottom wall 24 of the container 12 which latter wall has a series of arcuately arranged openings 25, communicating with the outlet tube 15 and which are adapted to register with the arcuate opening 23 as the valve stem is rotated to open the valve to a greater or lesser degree or to close off the valve entirely.

If desired, a perforated strainer 26 may be utilized within the container 12. This may be conveniently fixed to the valve stem 19 and generally conform to the container 12.

The modification shown in FIG. 9 is similar to that shown in FIG. 6 except the container 14 is enlarged to afford greater capacity. Other parts are the same as those in FIG. 6.

The modification of FIGS. 10 to 13 consists of a header 27 to which are connected a series of U-shaped seepage tubes 28 provided with perforations 29. The seepage tubes may be enclosed above and below by sheets 30 of water pervious material such as canvas or burlap or perforated plastic sheeting. A filler of moisture retentive material such as peat moss 31 may also be enclosed by the upper and lower sheets 30 and may surround the tubes 28. Suitable fertilizer may also be combined with the moisture retentive material if desired.

A filler opening with cap, shown in detail in FIG. 13, is provided in header 27 to permit introduction of water to the device.

In FIGS. 10-A and 10-B the tubes are not enclosed between the sheets 30, but are laid slightly below the surface of the soil similar to the arrangement between the sheets 30.

The form of device shown in FIGS. 10 to 13 is especially adapted for use under lawns or other low ground cover plants.

Having described preferred forms of my invention what I desire to secure by Letters Patent is:

1. An irrigating device for plants and the like comprising:
   a. A flexible fluid disseminator, said disseminator having an elongated flexible perforated tube, the major portion of which is adapted to be placed beneath the surface of the ground adjacent the root system of plants for irrigating the same, said tube having means extending upward above the ground for connecting the same to a liquid supply;
   b. a plurality of separate liquid distributing elements spaced along said tube;
   c. each of the liquid distributing elements comprising a moisture retaining material of loosely assembled fibers surrounding said tube and a liquid pervious outer retainer surrounding the moisture retaining material for holding the same in place about the tube;
   d. ties at each end of each liquid pervious outer retainer for selectively positioning the location of the same;
   e. a liquid receptacle positioned in the liquid inlet end of the tube, said liquid receptacle having a perforated rotatable funnel like element for receiving the liquid;
   f. a liquid tight outer container for receiving said liquid from the funnel like element;
   g. a valve positioned adjacent the bottom of the outer container;
   h. A handle for rotating said funnel like element, the funnel like element having a flat surface adjacent its apex and perpendicular to the rotatable axis of the funnel like element;
   i. a stationary portion of said valve carried by the said outer container comprising a flat surface positioned adjacent the flat surface of the funnel like element having a plurality of openings therethrough;
   j. means carried by the rotating surface for rotating and closing said openings through the stationary surface of the said valve when the funnel like element is rotated by said handle to regulate the flow of liquid into the tube.

* * * * *